US012656235B2

(12) United States Patent  (10) Patent No.: US 12,656,235 B2
Tu et al.  (45) Date of Patent: Jun. 16, 2026

(54) MODEL TEST DEVICE FOR SIMULATING ENVIRONMENTAL LOAD AND SCOURING EFFECT ON SUCTION CAISSON

(71) Applicant: East China Jiaotong University, Nanchang (CN)

(72) Inventors: Wenbo Tu, Nanchang (CN); Linya Liu, Nanchang (CN); Xiaoqiang Gu, Shanghai (CN); Changjie Xu, Nanchang (CN); Jiandong Xiao, Shanghai (CN); Pengfei Zhang, Nanchang (CN); Mingxin Zheng, Nanchang (CN); Kai Ye, Nanchang (CN); Ruping Luo, Nanchang (CN)

(73) Assignee: East China Jiaotong University, Nanchang (CN)

( * ) Notice: Subject to any disclaimer, the term of this patent is extended or adjusted under 35 U.S.C. 154(b) by 442 days.

(21) Appl. No.: 18/515,514

(22) Filed: Nov. 21, 2023

(65) Prior Publication Data

US 2024/0295479 A1      Sep. 5, 2024

(30) Foreign Application Priority Data

Mar. 1, 2023    (CN) ......................... 202310186176.X

(51) Int. Cl.
*G01N 3/24*          (2006.01)
*E02D 27/42*        (2006.01)
*E02D 27/52*        (2006.01)

(52) U.S. Cl.
CPC ............. *G01N 3/24* (2013.01); *E02D 27/425* (2013.01); *E02D 27/52* (2013.01)

(58) Field of Classification Search
CPC ........ G01N 3/24; E02D 27/425; E02D 27/52; G01M 7/02; G01M 9/08; G01M 99/007
See application file for complete search history.

(56) References Cited

FOREIGN PATENT DOCUMENTS

CN          115200815 A  * 10/2022  ............... G01N 3/06

* cited by examiner

*Primary Examiner* — Timothy P Graves

(57) ABSTRACT

A model test device for simulating environmental load and scouring effect on a suction caisson includes a laminar shear box. Multiple scouring pit simulation mechanisms are arranged around the suction caisson inside the laminar shear box, each scouring pit simulation mechanism includes a bracket disposed in the laminar shear box, the bracket is equipped with a telescopic arm connected to a cutting plate, and the cutting plate is curved fan-shaped. When the cutting plates move to positions where they are in contact with an outer wall of the suction caisson, the cutting plates are mutually connected to form a ring surrounding the suction caisson. An inner edge of the ring forms a complete circle attached to the outer wall of the suction caisson, an outer edge of the ring is higher than its inner edge, and the outer edge is located above the saturated soft clay in the water body.

10 Claims, 2 Drawing Sheets

MODEL TEST DEVICE FOR SIMULATING ENVIRONMENTAL LOAD AND SCOURING EFFECT ON SUCTION CAISSON

TECHNICAL FIELD

The disclosure relates to the field of offshore wind turbine foundations, and more particularly to a model test device for simulating environmental load and scouring effect on a suction caisson.

BACKGROUND

As one of the most representative renewable energy sources, wind power has ushered in tremendous development opportunities under the background of net zero emissions. Both the International Energy Agency (IEA) and the International Renewable Energy Agency (IRENA) have said that to achieve net zero emissions, wind, solar and photovoltaic power generation will provide about 70% of power generation by 2050. Offshore wind power is an important part of wind power. Compared with onshore wind power, offshore wind power has the advantages of strong stability, high wind speed, high power generation efficiency, no land occupation, and negligible noise and visual impact. It can be seen that offshore wind power will become the core of global decarbonization in the coming decades, and it is also an important measure to help achieve "carbon neutrality". Suction caisson is a common type of offshore wind turbine foundation. Because the structural geometry and operating characteristics of offshore wind turbines have the characteristics of a high center of gravity and large horizontal force, the suction caisson is not only subjected to vertical load caused by the dead weight of the superstructure, but also subjected to the combined action of long-term reciprocating horizontal load and bending moment load caused by wind load, waves, etc. According to statistics, the suction caisson with a design service life of 20-30 years can withstand load cycles for tens of millions of times. Although the load is low and slow, such a large number of cyclic load effects will cause the accumulation of pore water pressure in the soil around the foundation, which will lead to liquefaction of sandy seabed or softening of clay, accompanied by large plastic cumulative deformation leading to instability and failure of the foundation. Many data also show that the soil around the foundation is prone to be scoured under the long-term wind and wave cyclic load, and the soil loss and stress state change around the foundation caused by it will further change the mechanical performance of the foundation, which is an important challenge to the safety and stability of the offshore structure foundation. In addition, China's southeast coast is rich in offshore wind energy resources. In recent years, offshore wind farms in coastal areas of China, such as Guangdong, Jiangsu and Zhejiang provinces, are in full swing. However, it is worth noting that most of these areas are located in the southeast coastal seismic belt of China, and the dynamic response of the foundation under seismic effects will undoubtedly be amplified when it is subjected to wind and wave loading effects, thus the seismic effects cannot be ignored under long-term operation. Therefore, how to accurately evaluate the stress performance of the foundation under long-term wind and wave loading effects, clarify the coupling mechanism of wind, wave and earthquake loads, obtain the dynamic performance of the foundation under wind, wave and earthquake coupling load, so as to ensure its long-term normal operation, is an urgent engineering problem to be solved.

Centrifugal shaking table test is an effective way to study the above problems. Traditional centrifugal shaking table tests can only simulate the dynamic response of the foundation under earthquake load (also referred to as seismic load), but there is no effective measure to simulate the dynamic performance of the foundation under long-term cyclic wind and wave load and to realize the simulation of scouring effect without stopping the machine at the same time. Therefore, how to effectively simulate the dynamic performance of the foundation under long-term cyclic wind and wave load in the centrifugal shaking table test, realize scouring effect simulation, and monitor and record the changes of the foundation mechanical characteristics before and after scouring, so as to evaluate the working characteristics of the suction caisson under long-term wind and wave, earthquake and their coupling loads in practical projects is of great significance to the promotion and application of offshore wind power.

A China patent application with publication number CN114894509A relates to a centrifuge test model for suction barrel foundation test, which has the following problems when in use:

1. the test model cannot simulate the situation of the suction caisson subjected to the action of long-term wind and wave load, scouring effect, and earthquake, wind, and wave coupling load;
2. the test model uses a counterweight structure, which has poor stability and usability during the continuous rotation of the centrifugal machine, thus affecting test results; and
3. the test model can only ensure the penetration verticality of the suction caisson in the non-centrifugal state, but it cannot be guaranteed in the centrifugal state, and it is not possible to perform the test under the action of greater centrifugal force.

SUMMARY

In order to solve the above technical problems, the disclosure provides a model test device for simulating environmental load and scouring effect on a suction caisson.

Technical solutions are as follows. The disclosure provides a model test device for simulating environmental load and scouring effect on a suction caisson, including a laminar shear box. A suction caisson model is disposed in the laminar shear box, and the suction caisson model includes the suction caisson connected to a vacuum system, and a lower part of the suction caisson is provided with saturated soft clay, and an upper part of the saturated soft clay is provided with a water body. A top of the laminar shear box is provided with a penetration mechanism, and the suction caisson is connected to the penetration mechanism through a connecting rod.

Multiple groups of scouring pit simulation mechanisms are arranged around the suction caisson in the laminar shear box. Each scouring pit simulation mechanism includes a bracket arranged in the laminar shear box, the bracket is provided with a telescopic arm connected to a cutting plate, and the cutting plate is curved fan-shaped. When all the cutting plates move to positions where the cutting plates are in contact with an outer wall of the suction caisson, the cutting plates are mutually connected to form a ring surrounding the suction caisson, an inner edge of the ring forms a complete circle attached to the outer wall of the suction caisson, an outer edge of the ring is higher than the inner edge of the ring, and the outer edge is located above the saturated soft clay in the water body.

In an embodiment, the laminar shear box is further provided with a vibration exciting system. The vibration exciting system includes a counterforce frame connected to an inner wall of the laminar shear box. The counterforce frame is provided with a motor, and the motor is movably connected to the connecting rod on the suction caisson through a vibrating rod.

In an embodiment, the connecting rod is provided with an open sliding groove, and an open width of the open sliding groove is greater than a width of the vibrating rod and smaller than an inner width of the open sliding groove. An end of the vibrating rod is equipped with a steel ball whose diameter is greater than the opening width of the open sliding groove and smaller than the inner width of the open sliding groove to make the steel ball be capable of moving up and down along an interior of the open sliding groove.

In an embodiment, the penetration mechanism includes supports located at the top of the laminar shear box, the supports are provided with a guide rail, the guide rail is provided with a driving rod, the driving rod passes through the top of the laminar shear box and is connected to an electromagnetic adsorption mechanism located inside the laminar shear box, a guide cover is connected below the electromagnetic adsorption mechanism, and a top of the connecting rod is located inside the guide cover. The guide rail is connected to a lateral driving mechanism capable of displacing the guide rail horizontally, and a top of the driving rod is connected to a vertical driving mechanism.

In an embodiment, the laminar shear box is provided with an elongated sliding groove at a part where the driving rod passes through on the laminar shear box, and the guide rail extends into the elongated sliding groove and is capable of moving within the elongated sliding groove.

In an embodiment, the lateral driving mechanism includes a lateral transmission rack connected to the guide rail and a gear connected to the supports and meshed with the lateral transmission rack, and the gear is connected to a driving mechanism.

In an embodiment, the connecting rod is provided with a limiting mass block at the top of the connecting rod, the limiting mass block is located inside the guide cover and is limited by an inner wall of the guide cover, and the limiting mass block is capable of moving up and down along the inner wall of the guide cover.

In an embodiment, a soil body of the saturated soft clay is provided with multiple sensors, and the multiple sensors are distributed in the soil body inside and outside a side wall of the suction caisson by taking a position of the suction caisson after completely penetration into the soil body as a reference.

In an embodiment, the laminar shear box is provided with a T-type penetrometer (T-bar).

In an embodiment, the laminar shear box is provided with multiple laser displacement meters, and the multiple laser displacement meters are configured (i.e., structured and arranged) to monitor the displacement of the suction caisson in various directions.

The model test device for simulating the environmental load and scouring effect of the suction caisson has the following beneficial effects as follows.

1. The model can simulate the long-term wind and wave load and scouring effect of the suction caisson foundation.

2. The model can simulate working conditions under the combined action of earthquake, earthquake, wind and wave load.

3. The model is not equipped with a counterweight structure, and has high stability and availability during the continuous rotation of the centrifuge, which ensures the accurate test results.

4. By setting the penetration mechanism, the displacement deviation during penetration process can be dynamically corrected, so that the device of the disclosure can continuously carry out the test without stopping the centrifuge.

DETAILED DESCRIPTION OF EMBODIMENTS

Figure 1:
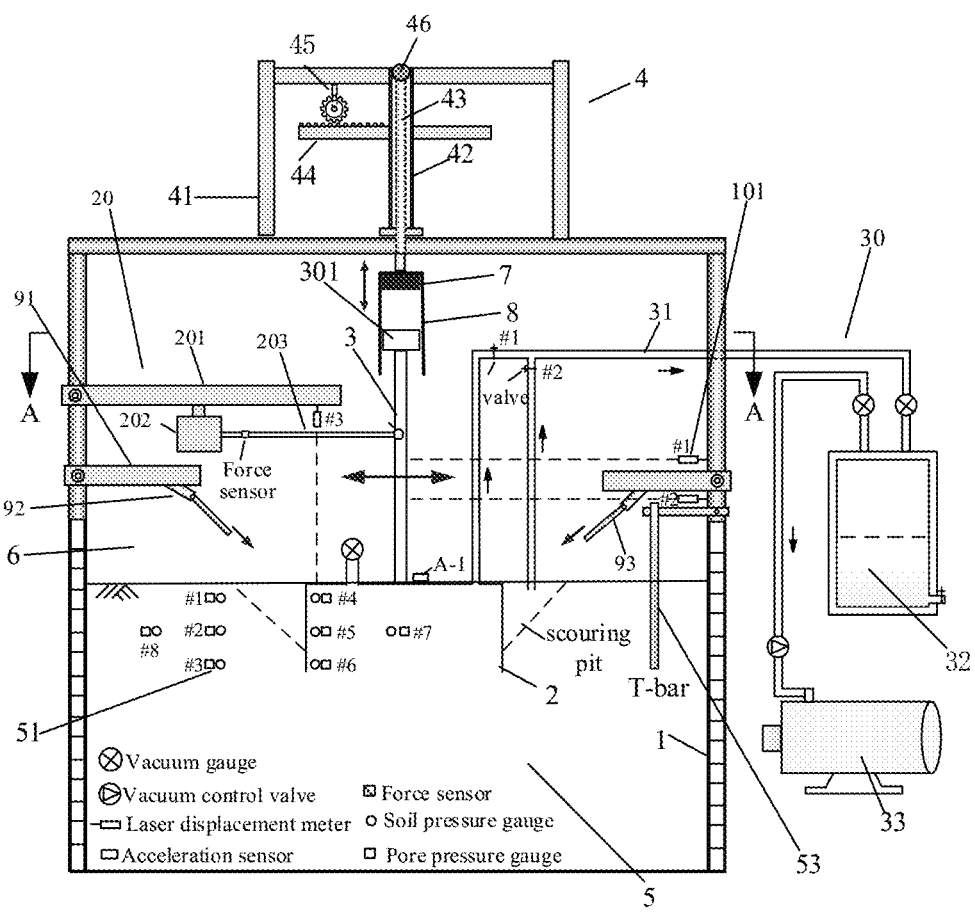
FIG. 1 illustrates a schematic structural diagram of a model test device for simulating environmental load and scouring effect on a suction caisson of the disclosure.

The disclosure is further described below with reference to embodiments and the accompanying drawings.

As shown in FIGS. 1-6, a model test device for simulating environmental load and scouring effect on a suction caisson of the disclosure includes a laminar shear box 1, and a suction caisson model is arranged in the laminar shear box 1. The suction caisson model includes a suction caisson 2 and a connecting rod 3, a top of the laminar shear box 1 is provided with a penetration mechanism 4, and a top end of the connecting rod 3 is movably connected to the penetration mechanism 4. The suction caisson 2 is connected to a vacuum system 30, a lower part of the suction caisson 2 is provided with saturated soft clay 5, and an upper part of the saturated soft clay 5 is provided with a water body 6. Multiple sensors 51 are arranged in the saturated soft clay 5, the sensors 51 are soil pressure gauges and/or pore water pressure gauges, and the sensors 51 are distributed in the soil body of the saturated soft clay inside and outside a side wall of the suction caisson by taking a position of the suction caisson after completely penetration into the soil body as a reference. Multiple laser displacement meters 101 are arranged in the laminar shear box 1, and the laser displacement meters 101 are configured to monitor displacement of the suction caisson in various directions. A T-type penetrometer 53 is also arranged in the saturated soft clay 5.

Multiple groups of scouring pit simulation mechanisms 9 are arranged in the laminar shear box 1, and each scouring pit simulation mechanism 9 includes a bracket 91 arranged in the laminar shear box, and the bracket 91 is provided with a telescopic arm 92, one end of the telescopic arm 92 is connected to a cutting plate 93. The cutting plate 93 is a curved fan-shaped. When all the cutting plates 93 move to a position where the cutting plates 93 are in contact with an outer wall of the suction caisson 2, the multiple cutting plates are mutually connected to form a ring surrounding the suction caisson 2, an inner edge of the ring forms a complete circle attached to the outer wall of the suction caisson 2, an outer edge of the ring is higher than its inner edge, and in this situation, the outer edge is located above the saturated soft clay in the water body. In order to ensure the sealing performance between the cutting plates when working, slots 931 are formed at least at the locations where the cutting plates are in contact with the suction caisson, and rubber sealing rings are arranged in the slots 931 to ensure that the saturated soft clay in the annular area formed by the multiple cutting plates is isolated from the saturated soft clay in other parts.

Figure 6:
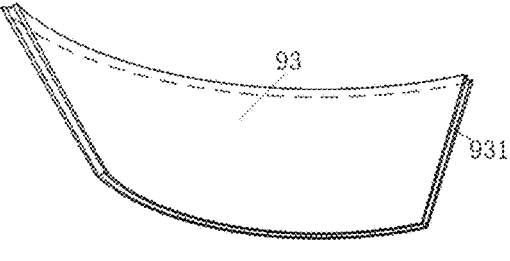
FIG. 6 illustrates a schematic structural diagram of a cutting plate.

The laminar shear box 1 is further provided with a vibration exciting system 20, the vibration exciting system 20 includes a counterforce frame 201 connected to an inner wall of the laminar shear box 1, and a motor 202 is arranged on the counterforce frame 201, and the motor 202 is movably connected to the connecting rod 3 on the suction caisson through a vibrating rod 203. Specifically, as shown in FIG. 1 and FIG. 6, an open sliding groove 311 is arranged in the connecting rod 3, an open width of the open sliding groove 311 is greater than a width of the vibrating rod 203 and smaller than an inner width of the open sliding groove 311. An end of the vibrating rod 203 is equipped with a steel ball whose diameter is greater than the opening width of the open sliding groove 311 and smaller than the inner width of the open sliding groove 311 to make the steel ball be capable of moving up and down along an interior of the open sliding groove 311.

The vacuum system 30 includes a duct 31 with one end connected to the suction caisson 2, the other end of the duct 31 is connected to a water-gas conversion mechanism 32, and the water-gas conversion mechanism 32 is connected to a vacuum pump 33. Specifically, the vacuum system 30 can choose other existing devices or systems that can achieve the same functions as the disclosure.

Figure 3:
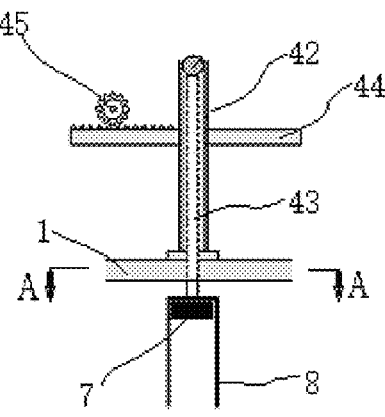
FIG. 3 illustrates a schematic partial structural diagram of a penetration mechanism.

As shown in FIG. 3, the penetration mechanism 4 includes supports 41 located at the top of the laminar shear box 1, a guide rail 42 is arranged on the supports 41, and a driving rod 43 is arranged in the guide rail 42. After passing through the top of the laminar shear box 1, the driving rod 43 is connected to an electromagnetic adsorption mechanism 7 located in the laminar shear box. A guide cover 8 is connected below the electromagnetic adsorption mechanism 7, and a top end of the connecting rod 3 is located in the guide cover. The guide rail 42 is connected to a lateral driving mechanism capable of displacing the guide rail horizontally, and a top end of the driving rod 43 is connected to a vertical driving mechanism 46. Specifically, the lateral driving mechanism includes a lateral transmission rack 44 connected to the guide rail 42 and a gear 45 connected to the supports 41 and meshed with the lateral transmission rack 44, the gear 45 is connected to a driving mechanism, and the driving mechanism can be a motor. The vertical driving mechanism 46 connected to the top end of the driving rod 43 can usually be a hydraulic driving mechanism or other existing devices or structures that can push and pull the driving rod 43. The top end of the connecting rod 3 is provided with a limiting mass block 301, the limiting mass block 301 is located in the guide cover 8 and limited by an inner wall of the guide cover 8 and can move up and down along the inner wall of the guide cover 8.

Figure 4:
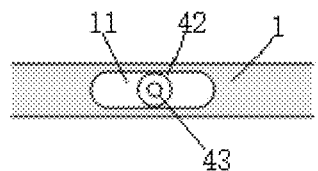
FIG. 4 illustrates a sectional view taken along a cutting plane line A-A of FIG. 3.
Figure 5:
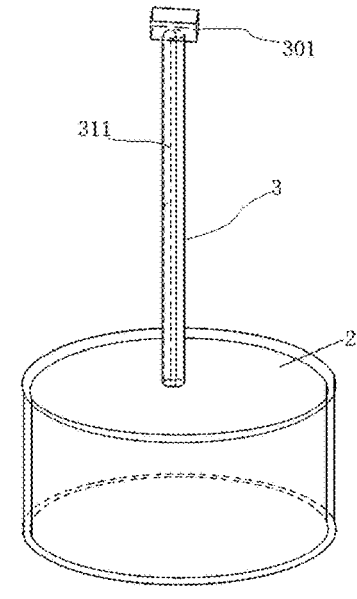
FIG. 5 illustrates a schematic structural diagram of a suction caisson model.

As shown in FIG. 4, an elongated sliding groove 11 is arranged at the position where the driving rod 43 passes on the laminar shear box 1, and the guide rail 42 extends into the elongated sliding groove 11 and can move within the elongated sliding groove 11.

During the test, the centrifuge is first turned on and operated to the centrifugal acceleration designed for the test, and then the penetration test is carried out using the T-type penetrometer to measure the penetration resistance of saturated soft clay and estimate the magnitude of the penetration force. The penetration mechanism is operated to make the suction caisson adsorbed on the electromagnetic adsorption mechanism to be lowered along the driving rod 43. When a bottom of the suction caisson is lowered to a surface of saturated soft clay, the suction caisson is disconnected from the electromagnetic adsorption mechanism 7, so that the suction caisson completes the penetration firstly under the self-gravitational weight.

After the suction caisson completes the self-weight penetration, the suction penetration is implemented. The vacuum system 30 is used for vacuumizing, the valve #1 is opened and the valve #2 is closed, the suction force is controlled by the vacuum control valve. Through the smooth transition of suction force by the water-gas conversion mechanism 32, the water-gas conversion mechanism 32 can also effectively avoid water into the vacuum pump until the suction caisson is installed in the predetermined position. The guide cover can effectively prevent the suction caisson from tilting during the penetration process. A vacuum gauge can be set to record the vacuum degree, which is convenient for calculating the magnitude of the suction force. When horizontal inclination occurs in the process of suction penetration, the lateral driving mechanism can be controlled to drive the guide rail on the supports to move along the horizontal direction by using the gear to rotate clockwise or counterclockwise, so that the guide groove (formed in the guide cover) moves along the horizontal direction, and the guide groove acts on the limiting mass block 301 at the top of the suction drum, so as to make the overall structure to achieve the effect of horizontal tilt correction.

Figure 2:
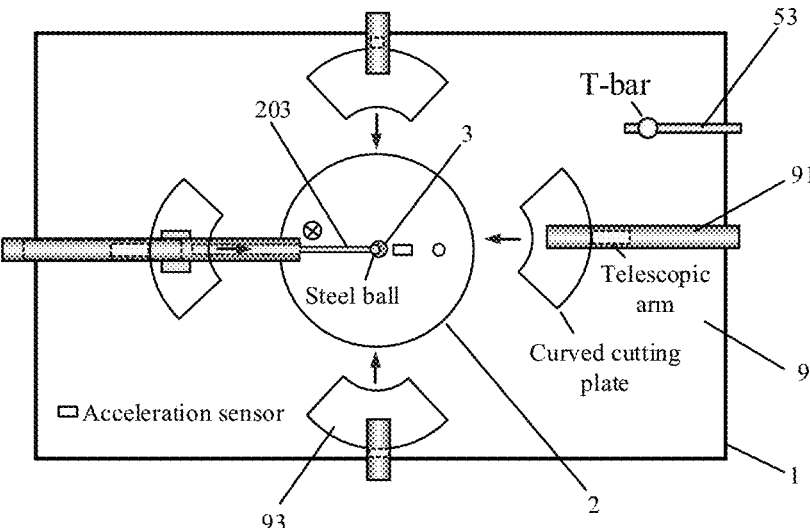
FIG. 2 illustrates a sectional view taken along a cutting plane line A-A of FIG. 1.

When the penetration is completed, the driving rod 43 is controlled to move upwardly, so that the guide groove is lifted above the limiting mass block 301. Then, the scouring pit simulation mechanisms are controlled, the telescopic arms are used to rotate and adjust the cutting plates to a predetermined scouring pit angle, and the telescopic arms are controlled simultaneously to extend close to the suction caisson and cut the soil body around the suction caisson. As a specific implementation, only four cutting plates are taken as an example in the disclosure. As shown in FIG. 2, when the front edges of the four cutting plates are completely in contact with the suction caisson, the four cutting plates are connected to each other to form a ring around the suction caisson, the inner edge of the ring forms a complete circle attached to the outer wall of the suction caisson, the outer edge of the ring is higher than its inner edge, and in this situation, the outer edge is located above the saturated soft clay in the water body. After that, the vacuum system is turned on, the valve #2 is opened and the valve #1 is closed, and the soil body in the annular area formed by the cutting plates is sucked into the water-gas conversion mechanism. When the soil body in the annular area is cleared, the telescopic arms are controlled to move the cutting plates to the initial positions.

After that, the vibration exciting system 20 is turned on, wind and wave load signals are input to the motor. In this case, the load is transmitted to the connecting rod 3 through the vibrating rod 203, and the force sensor arranged on the vibrating rod 203 is used to record the output wind and wave load signals to ensure that the input signals are consistent with the output signals. The shaking table is turned on simultaneously to simulate the earthquake load, and in this situation, the system will simulate the offshore wind turbine suction caisson foundation to withstand the wind, wave, and earthquake loads, and take into account the scouring effect.

During the loading process, the vibration response of the top of the foundation is obtained by the acceleration sensor A-1 (as shown in FIG. 1, which can be installed on the suction caisson), the vertical and horizontal displacement and rotation angle of the foundation are obtained by the laser displacement meter, and the variation laws of soil pressure and pore water pressure along the horizontal and depth directions are monitored and recorded by the soil pressure gauge and the pore water pressure gauge.

What is claimed is:

1. A model test device for simulating environmental load and scouring effect on a suction caisson, comprising:

a laminar shear box, wherein a suction caisson model is disposed inside the laminar shear box, the suction caisson model comprises the suction caisson being cylindrical in shape and connected to a vacuum system, a lower part of the suction caisson is provided with saturated clay, and an upper part of the saturated clay is provided with a water body; a top of the laminar shear box is provided with a penetration mechanism, and the suction caisson is connected to the penetration mechanism through a connecting rod;

wherein a plurality of groups of scouring pit simulation mechanisms are arranged around the suction caisson inside the laminar shear box, and each of the plurality of groups of scouring pit simulation mechanisms comprises a bracket disposed in the laminar shear box, the bracket is provided with a telescopic arm connected to a cutting plate, and the cutting plate is curved fan-shaped;

when all the cutting plates move to positions where the cutting plates are in contact with an outer wall of the suction caisson, the cutting plates are mutually connected to form a ring surrounding the suction caisson, an inner edge of the ring forms a complete circle attached to the outer wall of the suction caisson, an outer edge of the ring is higher than the inner edge of the ring, and the outer edge is located above the saturated clay in the water body.

2. The model test device according to claim 1, wherein the laminar shear box is further provided with a vibration exciting system, the vibration exciting system comprises a counterforce frame connected to an inner wall of the laminar shear box, the counterforce frame is provided with a motor, and the motor is movably connected to the connecting rod on the suction caisson through a vibrating rod.

3. The model test device according to claim 2, wherein the connecting rod is provided with an open sliding groove, and an open width of the open sliding groove is greater than a width of the vibrating rod and smaller than an inner width of the open sliding groove; an end of the vibrating rod is equipped with a steel ball whose diameter is greater than the opening width of the open sliding groove and smaller than the inner width of the open sliding groove to make the steel ball be capable of moving up and down along an interior of the open sliding groove.

4. The model test device according to claim 1, wherein the penetration mechanism comprises supports located at the top of the laminar shear box, the supports are provided with a guide rail, the guide rail is provided with a driving rod, the driving rod passes through the top of the laminar shear box and is connected to an electromagnetic adsorption mechanism located inside the laminar shear box, a guide cover is connected below the electromagnetic adsorption mechanism, and a top of the connecting rod is located inside the guide cover; the guide rail is connected to a lateral driving mechanism capable of displacing the guide rail horizontally, and a top of the driving rod is connected to a vertical driving mechanism.

5. The model test device according to claim 4, wherein the laminar shear box is provided with an elongated sliding groove at a part where the driving rod passes through on the laminar shear box, and the guide rail extends into the elongated sliding groove and is capable of moving within the elongated sliding groove.

6. The model test device according to claim 4, wherein the lateral driving mechanism comprises a lateral transmission rack connected to the guide rail and a gear connected to the supports and meshed with the lateral transmission rack, and the gear is connected to a driving mechanism.

7. The model test device according to claim 4, wherein the connecting rod is provided with a limiting mass block at the top of the connecting rod, the limiting mass block is located inside the guide cover and is limited by an inner wall of the guide cover, and the limiting mass block is capable of moving up and down along the inner wall of the guide cover.

8. The model test device according to claim 1, wherein a soil body of the saturated clay is provided with a plurality of sensors, and the plurality of sensors are distributed in the soil body inside and outside a side wall of the suction caisson by taking a position of the suction caisson after completely penetration into the soil body as a reference.

9. The model test device according to claim 1, wherein the laminar shear box is provided with a T-type penetrometer.

10. The model test device according to claim 1, wherein the laminar shear box is provided with a plurality of laser displacement meters, and the plurality of laser displacement meters are configured to monitor displacement of the suction caisson in various directions.

* * * * *